United States Patent
Tandon

(10) Patent No.: US 9,809,473 B2
(45) Date of Patent: Nov. 7, 2017

(54) WATER TREATMENT SYSTEM

(71) Applicant: Waterco Limited, Rydalmere (AU)

(72) Inventor: Pradeep Kumar Tandon, Rydalmere (AU)

(73) Assignee: Waterco Limited, Rydalmere (AU)

( * ) Notice: Subject to any disclaimer, the term of this patent is extended or adjusted under 35 U.S.C. 154(b) by 221 days.

(21) Appl. No.: 14/899,341

(22) PCT Filed: Jun. 26, 2014

(86) PCT No.: PCT/AU2014/000657
§ 371 (c)(1),
(2) Date: Dec. 17, 2015

(87) PCT Pub. No.: WO2014/205486
PCT Pub. Date: Dec. 31, 2014

(65) Prior Publication Data
US 2016/0152497 A1   Jun. 2, 2016

(30) Foreign Application Priority Data

Jun. 28, 2013   (AU) ................................ 2013902389

(51) Int. Cl.
*C02F 1/78* (2006.01)
*E04H 4/12* (2006.01)
(Continued)

(52) U.S. Cl.
CPC .................. *C02F 1/78* (2013.01); *C02F 1/50* (2013.01); *E04H 4/1281* (2013.01);
(Continued)

(58) Field of Classification Search
CPC .......... C02F 1/50; C02F 1/78; C02F 2103/42; C02F 2201/78; C02F 2209/03;
(Continued)

(56) References Cited

U.S. PATENT DOCUMENTS 8,075,784 B1   12/2011   Barnes
2005/0103725 A1   5/2005   Palm et al.
(Continued)

FOREIGN PATENT DOCUMENTS

DE   103 08 123 A1   9/2004
JP   2005-046831 A   2/2005
(Continued)

OTHER PUBLICATIONS

International Search Report issued in corresponding application No. PCT/AU2014/000657 dated Sep. 8, 2014.
International Preliminary Report on Patentability issued in corresponding application No. PCT/AU2014/000657 dated Nov. 6, 2015.
Supplementary European Search Report for corresponding European Application No. 14818622 dated Nov. 10, 2016.

*Primary Examiner* — Terry K Cecil
(74) *Attorney, Agent, or Firm* — Carter, DeLuca, Farrell & Schmidt, LLP

(57) ABSTRACT

A water treatment system includes a water mixing unit adapted to promote water turbulence, an input line having an upstream end adapted to be in fluid communication with a body of water to be treated, and a downstream end in fluid communication with the water mixing unit. The system includes an ozone injector adapted to be connected in fluid communication with an ozone gas generation system. A branching line is in fluid communication with the input line and the ozone injector and an ozone supply line is in fluid communication with the ozone injector and the input line. A bypass control valve is in fluid communication with the ozone supply line and the water input line and is adapted to be selectively switched between an open position and a closed position, wherein water is prevented from flowing through the branching line and the ozone supply line when the bypass control valve is in the closed position.

14 Claims, 4 Drawing Sheets

(51) Int. Cl.
  *C02F 1/50* (2006.01)
  *C02F 103/42* (2006.01)
(52) U.S. Cl.
  CPC ...... *C02F 2103/42* (2013.01); *C02F 2201/78* (2013.01); *C02F 2209/03* (2013.01); *C02F 2209/38* (2013.01); *C02F 2301/024* (2013.01); *C02F 2301/043* (2013.01); *C02F 2303/04* (2013.01); *E04H 4/12* (2013.01)
(58) Field of Classification Search
  CPC .............. C02F 2209/23; C02F 2209/38; C02F 2301/024; C02F 2301/043; C02F 2303/04; E04H 4/12; E04H 4/1281
  See application file for complete search history.

(56) References Cited

U.S. PATENT DOCUMENTS

| | | | | |
|---|---|---|---|---|
| 2008/0116149 A1* | 5/2008 | Dick | ................. | C02F 1/78 210/760 |
| 2008/0223788 A1 | 9/2008 | Rimdzius et al. | | |
| 2013/0284647 A1* | 10/2013 | Briscoe | ................. | C02F 1/008 210/96.1 |

FOREIGN PATENT DOCUMENTS

| | | | | |
|---|---|---|---|---|
| WO | 03/016224 A1 | 2/2003 | | |
| WO | WO-2008155649 A1 * | 12/2008 | ............... | B04C 5/04 |
| WO | 2012/056249 A1 | 5/2012 | | |
| WO | 2012/103597 A1 | 8/2012 | | |

\* cited by examiner

WATER TREATMENT SYSTEM

FIELD OF THE INVENTION

The present invention relates to a water treatment system. In particular, the present invention relates to a water treatment system for treating swimming pool or spa water. However, it will be appreciated by those skilled in the art that the invention may be deployed for treating water and other liquids in other fields of usage.

BACKGROUND OF THE INVENTION

Ozone gas ($O_3$) provides a powerful disinfectant and oxidant when used for the treatment of water. Ozone is environmentally friendly, and decomposes to the more stable diatomic allotrope of oxygen ($O_2$), during water treatment, minimising harmful bi-products.

Each three atom ozone molecule is relatively unstable and readily gives up one atom of oxygen providing a powerful oxidizing agent which is toxic to most waterborne organisms. Ozone provides a strong, broad spectrum disinfectant, and is an effective agent to inactivate harmful protozoa, microbes and other pathogens.

Ozone is commercially made by passing oxygen through ultraviolet light or alternatively using an electrical discharge. The most common ozone production technique involves corona discharge, whereby a high voltage electrical discharge is passed across a gap through which filtered dry air flows.

Ozone when used for water purification is generally created on-site and added to the water by bubble contact. Some of the advantages of ozone include the production of fewer dangerous by-products and the absence of taste and odor problems which are prevalent in comparison when chlorination is used to treat water. Another advantage of ozone is that it leaves no residual disinfectant in the water after treatment has occurred. Ozonation can be used to treat organic and inorganic contaminants, including bacteria, viruses and protozons.

Whilst ozonation provides an effective means for water treatment in various applications from swimming pools to potable drinking water, there are inherent drawbacks in existing ozonation systems. One problem is the need to efficiently mix the ozone source with the water requiring treatment. For disinfection to occur, the ozone molecules must physically contact the contaminant to react with it. If an inadequate degree of mixing occurs, there is a risk of the ozone not coming into contact with parcels of water, and accordingly only partially treating the water.

This drawback is compounded by the short life span of the ozone molecule, which typically degrades in a short period of time back to the diatomic allotrope of oxygen ($O_2$), after the third atom, disassociates from the ozone particle as a free radical. As such, the ozone molecules normally only last for a few minutes or less after adding to water. Accordingly, if the ozone molecules do not come into contact with the contaminants shortly after being introduced into the water flow, the likelihood of effective water treatment is significantly reduced.

In addition, on account of the added electrical input and hence costs associated with producing the ozone, it is preferable to minimise the ozone production, and not produce surplus ozone beyond what is required for adequate decontamination.

A further problem with ozone treatment is that the water will almost always need to be filtered or settled after ozone exposure, as ozone tends to coagulate and precipitate various impurities present in the water.

The size of the ozone gas bubble released into the water for treatment is an important factor. A bubble size of 2 to 3 microns is generally desirable, and for good gas to liquid transfer, the smallest achievable bubble size is generally preferable. Ozone gas is difficult to efficiently mix into an aqueous solution. In order to reach the full potential of the ozone to treat the water, saturation of the ozone gas in the aqueous solution is generally required.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a water treatment system comprising:
  a water mixing unit adapted to promote water turbulence;
  an input line having an upstream end adapted to be in fluid communication with a body of water to be treated, and a downstream end in fluid communication with the water mixing unit;
  an ozone injector adapted to be connected in fluid communication with an ozone gas generation system;
  a branching line in fluid communication with the input line and the ozone injector;
  an ozone supply line in fluid communication with the ozone injector; and
  a bypass control valve in fluid communication with the ozone supply line and the input line and adapted to be selectively switched between an open position and a closed position, wherein water is prevented from flowing from the ozone supply line through the bypass control valve and into the input line when the bypass control valve is in the closed position.

The water treatment system further preferably comprises a pressure differential measuring device adapted to measure a pressure differential between a first location in the input line upstream relative to the bypass control valve, and a second location in the input line downstream relative to the bypass control valve.

The first location is preferably positioned in the input line between the bypass control valve and a connection with the branching line.

The pressure differential measuring, device preferably includes;
  a housing;
  a first tube in fluid communication with an upstream side of the housing and the water input line upstream of the bypass control valve; and
  a second tube in fluid communication with a downstream side of the housing and the water input line downstream of the bypass control valve.

The pressure differential measuring device preferably includes a pressure indicator adapted to provide a user with an indication of the measured pressure differential.

The bypass control valve preferably includes one or more partially open positions.

The bypass control valve partially open positions preferably correspond to measurements on a gauge identified on the pressure indicator, enabling selection of a desired flow rate through the ozone injector to achieve a desired pressure differential and ozone delivery rate.

The ozone injector preferably includes a Venturi nozzle and a gas inlet port located at or near a restriction formed in the Venturi nozzle.

The ozone gas generation system preferably includes a ultra-violet ozone generation system.

The water mixing unit is preferably a multi-cyclone unit.

In a second aspect, the present invention provides an ozone administering and measuring unit comprising:

an input line having an upstream end adapted to be in fluid communication with a body of water to be treated, and a downstream end adapted to be in fluid communication with the body of water;

an ozone injector which is connectable to an ozone gas generation system;

a branching line in fluid communication with the input line and the ozone injector;

an ozone supply line in fluid communication with the ozone injector;

a bypass control valve in fluid communication with the ozone supply line and the water input line, the bypass control valve having an open position and a closed position, wherein water is prevented from flowing from the ozone supply line through the bypass control valve and into the input line when the bypass control valve is in the closed position; and a pressure differential measuring device adapted to measure a pressure differential between a first location upstream relative to the bypass control valve, and a second location downstream relative to the bypass control valve.

Preferably the first location is on the input line between the bypass control valve and a connection with the branching line.

The pressure differential measuring, device preferably includes;

a housing;

a first tube in fluid communication with an upstream side of the housing and the water input line upstream of the bypass control valve; and a second tube in fluid communication with a downstream side of the housing and the water input line downstream of the bypass control valve.

The pressure differential measuring device preferably includes a pressure indicator adapted to provide a user with an indication of the measured pressure differential.

In the ozone administering and measuring unit, a first position of the pressure indicator preferably indicates that a filter is blocked, and a second position of the pressure indicator preferably indicates that the input line is blocked.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

A water treatment system 10 is disclosed for treating water, and in particular the water of swimming pools and spas. However, it will be appreciated that the water treatment system 10 may be used to treat potable water and other water reservoirs or other liquids.

Water to be treated is drawn from an outlet port located in the swimming pool or body of water using a pump. The water may initially be filtered to remove sedimentary contaminants and other large particulate pollutants. The water is then directed through an input line 12 of the water treatment system 10.

Figure 1:
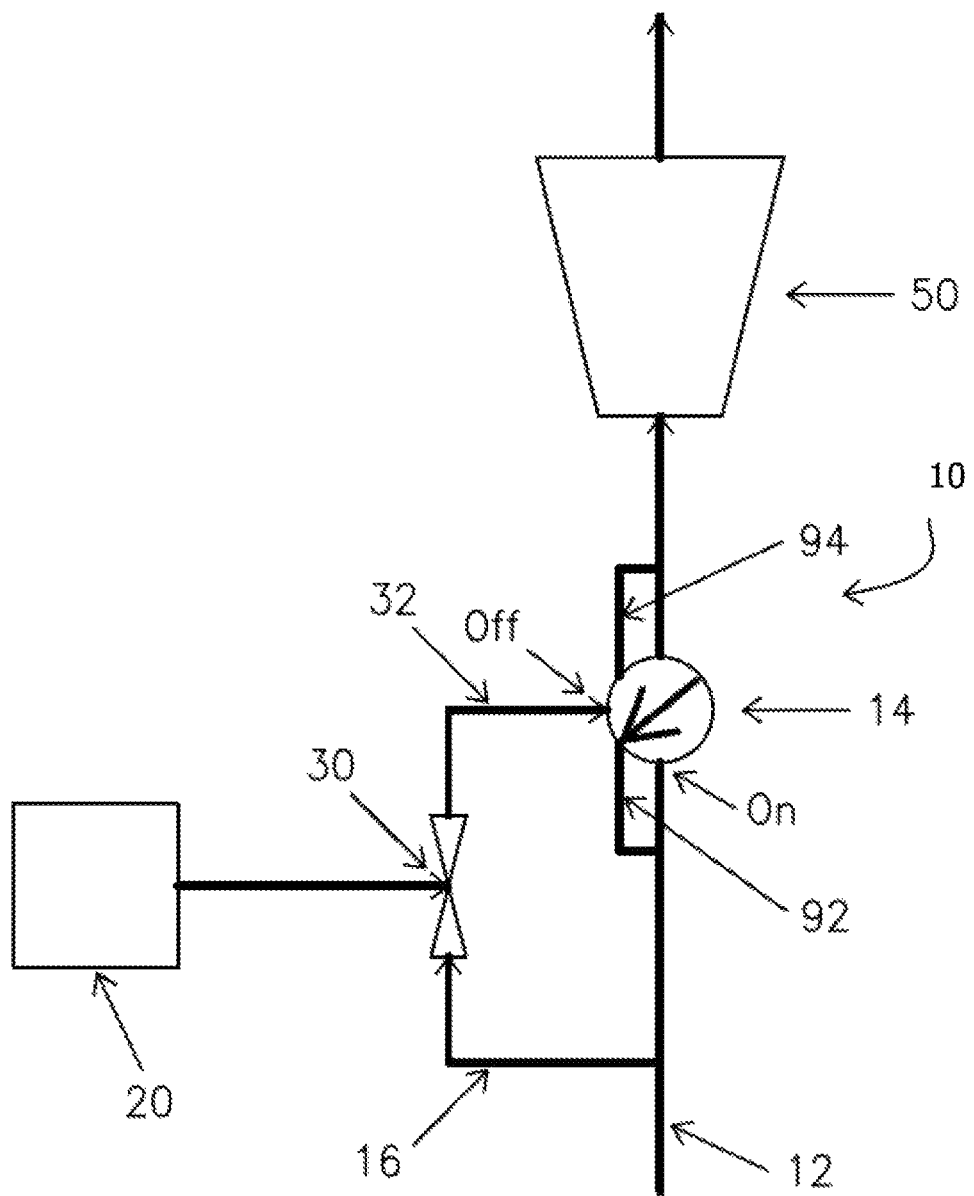
FIG. 1 is a schematic diagram depicting a water treatment system.
Figure 2:
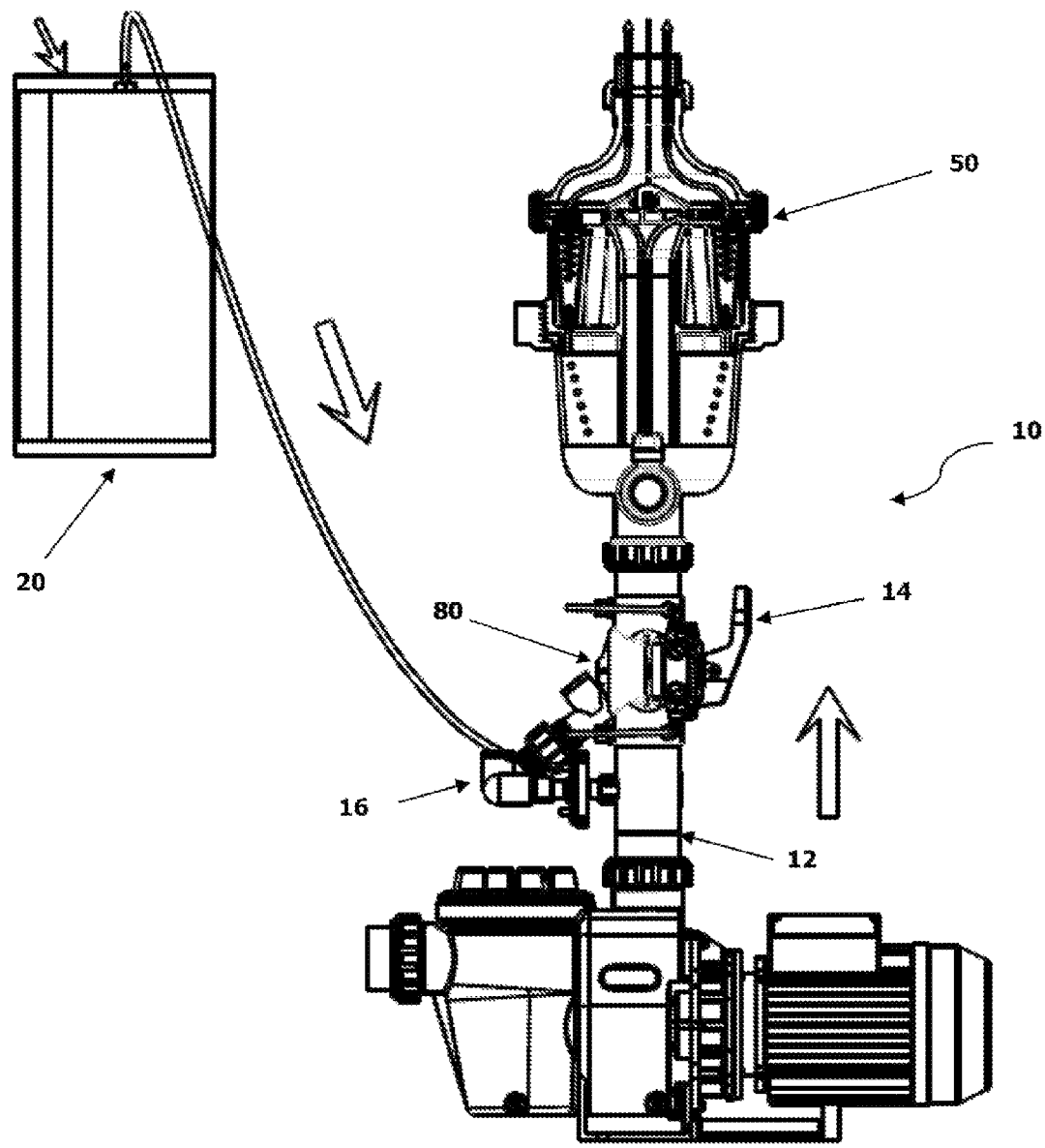
FIG. 2 is a schematic view depicting the water treatment system of FIG. 1.

The input line 12 is in fluid communication with a bypass control valve 14. A branching line 16 is connected to the input line 12, generally upstream of the bypass control valve 14, and the branching line 16 is in fluid communication with an ozone injector 30. An ozone supply line 32 extends between the ozone injector 30 and the bypass control valve 14. Accordingly, as shown in FIG. 1 the input line 12 and the ozone supply line 32 define a fluid flow path that diverges away from the input line 12 and subsequently reconverges with the input line 12.

The bypass control valve 14 can be, switched between an open position, a closed position, and one or more intermediate partially open positions. In the open position, and partially open positions, water is able to flow through the branching line 16, the ozone supply line 32 and the water subsequently passes through the bypass control valve 14, to rejoin the input line 12, further downstream of the bypass control valve 14.

Downstream of the bypass control valve 14, the input line 12 is in fluid communication with a water mixing unit 50 adapted to promote turbulence in the water. In the embodiment described herein, the water mixing unit 50 is a multi-cyclone centrifugal sediment filter 50. The multi-cyclone sediment filter 50 is disclosed in PCT/IB2008/001633 (WO/2008/155649) in the name of the present applicant, Waterco Limited. The entire contents of that specification are incorporated herein by reference. However, it will be appreciated by those skilled in the art that other suitable multi-cyclone sediment filters 50 may be used.

Different models of multi-cyclone sediment filter 50 can be used, depending on the volume of water to be treated. For example, the multi-cyclone sediment filter 50 may be provided with 40 sq ft cartridges, 75 sq ft cartridges or another suitable sized cartridge. The multi-cyclone sediment filter 50 enhances the ozone or other gas mixing within the flow of water.

There are various models of Multi-cyclone filters 50 which can be used, in the system 10, such as those manufactured by Waterco Limited under the brand MC50, MC40, MC12 Plus and Ultra, MC16 Plus and Ultra.

MC12, MC16 Plus and Ultra have additional chambers on top of the Multi-cyclone with 40 sq ft and 75 sq ft. cartridge elements for finer filtration. The Multi-cyclone sediment filter 50 can also be used with or without a filtration cartridge in the chamber to enhance ozone or gas mixing.

An ozone generation device 20, in the form of a UV ozone generation device 20 is located in or near the system 10. The ozone generation device 20 generates ozone by passing air across a vacuum ultra violet lamp, a process referred to as VUV ozone generation.

The generated ozone is then directed to an ozone injector 30 in the form of a dynamic injector 30. The dynamic injector 30 is in fluid communication with the ozone supply line 32. The dynamic injector 30 is a device that allows for the suitable transfer of the ozone gas into the water flow. In particular, it is preferably a Venturi injector 30, having an upstream water inlet in fluid communication with the branching line 16 and a downstream water outlet in fluid communication with the ozone supply line 32. There is a restriction defined by a reduction in cross-sectional area within the dynamic injector 30, and this provides a Venturi pressure reduction effect. The dynamic injector 30 includes one or more ozone/air inlet ports. The Venturi effect resulting from water flowing across the restriction, causes a negative pressure, which draws gas (in this case a mix of air/ozone) into dynamic injector 30 through the ozone/air inlet ports.

The water leaving the dynamic injector 30 in the ozone supply line 32 includes the mix of air/ozone and water. When the bypass control valve 14 is in an open position, the mix of air/ozone and water is sucked through the valve 14 and into the input line 12, where it continues to the multi-cyclone sediment filter 50.

Cyclonic action created within the multi-cyclone 50 creates high turbulence which in turn increases the dissolution of ozone gas. The way in which the multi-cyclone 50 achieves high turbulence through cyclonic action has not previously been applied to the process of mixing ozone gas into an aqueous solution. Cyclonic action in the multi-cyclone 50 acts as a contact chamber enhancing the mixing process of ozone or other gases in the water.

During the process of adding ozone gas to aqueous solutions, there are some situations in which chemical species precipitate out of the aqueous solution. The removal of the precipitate is facilitated by the cyclonic action within the multi-cyclone 50, which is designed to capture suspended particles. Accordingly, the waste bi-products generated by reaction with the ozone are advantageously removed by the cyclone effect within the multi-cyclone 50.

Figure 3:
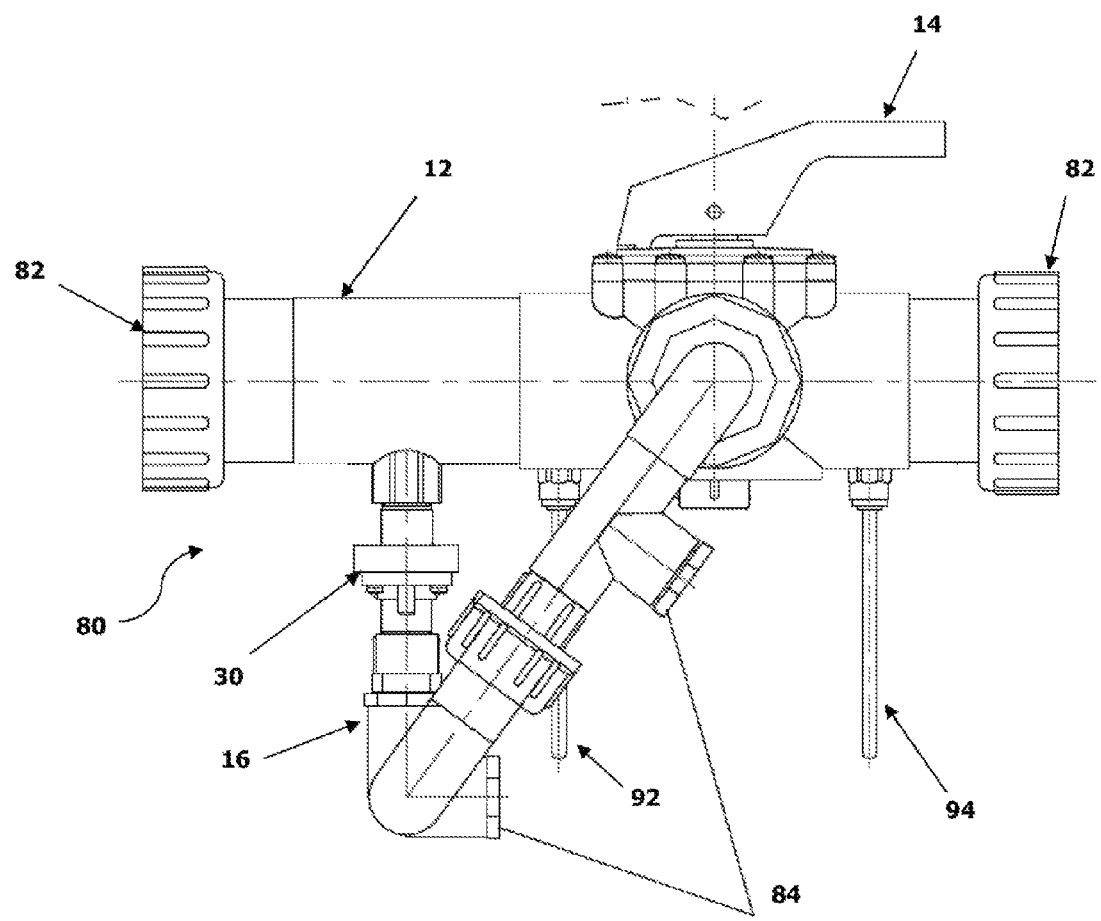
FIG. 3 is a front view of an ozone administering and measuring unit of the water treatment system.
Figure 4:
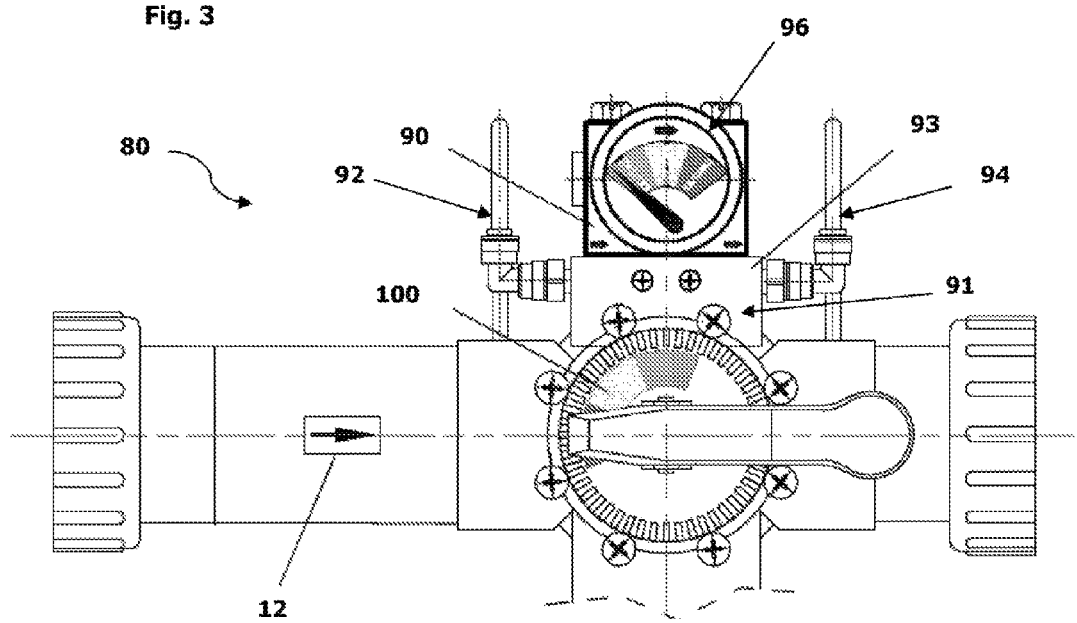
FIG. 4 is a top view of the ozone administering and measuring unit of FIG. 3.
Figure 5:
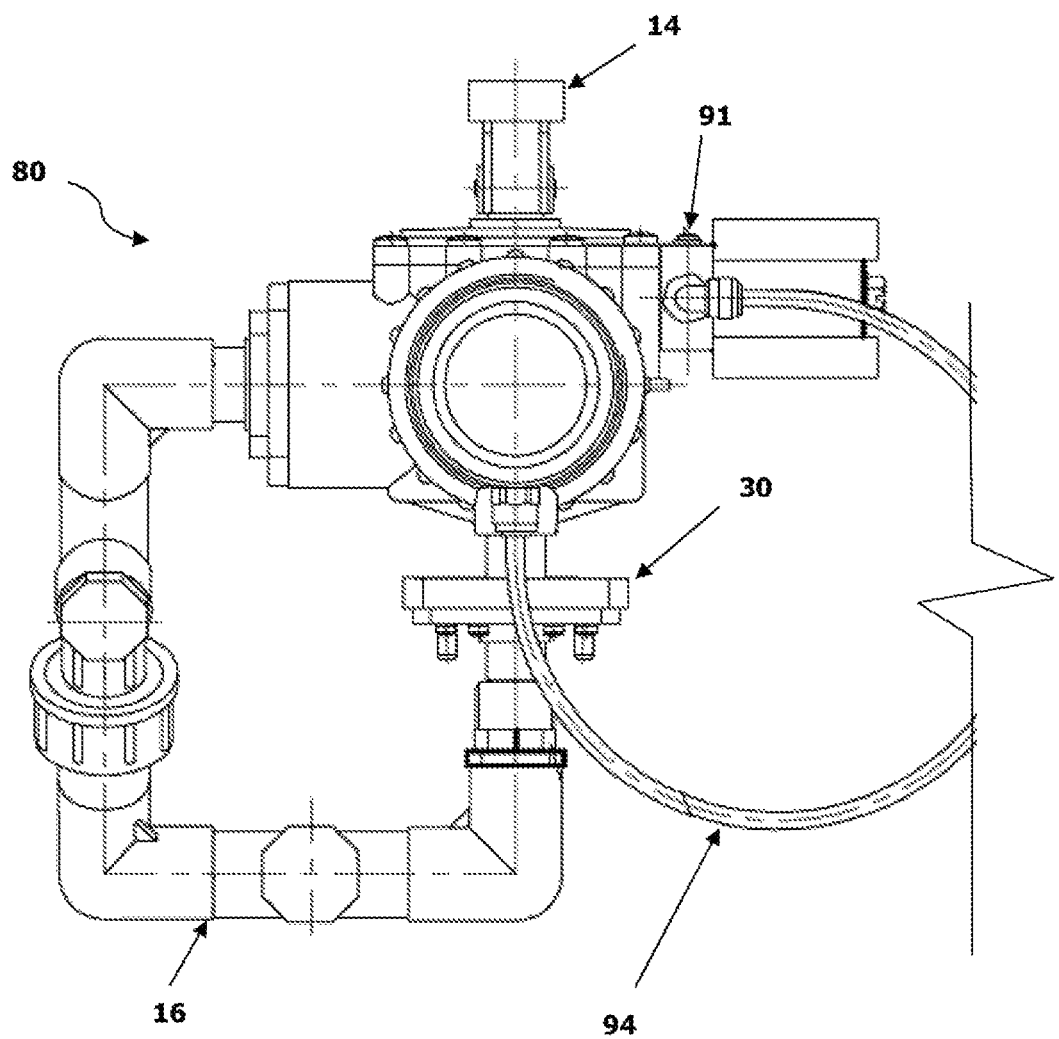
FIG. 5 is an end view of the ozone administering and measuring unit of FIG. 3.

The water treatment system 10 includes an ozone administering and measuring unit 80 which is depicted in isolation in FIGS. 3 to 5. The ozone administering and measuring unit 80 is defined by the branching line 16, the dynamic injector 30, the ozone supply line 32 (which extends between the dynamic injector 30 and the bypass control valve 14), the bypass control valve 14 and a portion of the water input line 12, and a pressure indicator 90.

As depicted in FIG. 3 for example, the two ends of the ozone administering and measuring unit 80, which form part of the water input line 12, are provided with screw connectors 82. This enables the ozone administering and measuring unit 80 to be readily removed from the water treatment system 10 for maintenance or replacement purposes.

The branching line 16 includes two screw plugs 84. The screw plugs 84 permit one or more sensors to be added to the ozone administering and measuring unit 80. For example, a PH and/or ORP (oxidation reduction potential) sensor may be installed in the ozone administering and measuring unit 80 at the screw plug 84 which is located closest to the dynamic injector 30. The other screw plug 84 which is located furthest from the dynamic injector 30 may be used for inserting a grounding sensor into the ozone administering and measuring unit 80.

The ozone administering and measuring unit 80 includes a pressure indicator 90 associated with a pressure differential measuring device 91, which are best seen in. FIG. 4. The pressure differential measuring device 91 includes a body or housing 93 which is in fluid communication with a first tube 92 and a second tube 94. The first and second tubes 92, 94 are typically manufactured from small diameter flexible conduit.

As illustrated in FIGS. 3 and 4, the first tube 92 has a first end connected to an upstream side of the housing 93. The first tube 92 is also connected at an opposing second end to the water input line 12 between the node where the branching line 16 diverges and the bypass control valve 14.

As illustrated in FIGS. 3 and 4, the second tube 94 has a first end connected to a downstream side of the housing 93. The second tube 94 is also connected at an opposing second end to the water input line 12, downstream of the bypass control valve 14 (between the bypass control valve 14 and the multi-cyclone centrifugal sediment filter 50).

The pressure indicator 90 is able to measure the pressure differences between the first tube 92 and the second tube 94, to thereby measure the pressure differential between two points in the ozone administering and measuring unit 80. The two measurement points are located on the input line 12 on opposing sides of the bypass control valve 14.

The pressure indicator 90 includes a user display gauge 96. In the embodiment depicted in the drawings, the display gauge 96 includes three different coloured or labelled regions. For example the display gauge 96 may be divided into 3 different segments, reading "CLEAN", "CHANGE" and "DIRTY". Similarly, the bypass control valve 14 has a user interface in the form of corresponding coloured or labelled regions 100.

When the bypass control valve 14 is open, water is permitted to divert through the branching line 16 where it is mixed with ozone provided by the dynamic injector 30. Alternatively, when the bypass control valve 14 is closed, all of the water passes from the water input line 12 directly through the bypass control valve 14, without passing the ozone injector 30. In the fully closed bypass valve 14 position, water is prevented from flowing through the branching line 16 or the ozone supply line 32. Accordingly, in the bypass switch 14 closed position, ozone is not mixed with the water.

Accordingly, by adjusting the bypass control valve 14, the user is able to adjust the pressure differential across the valve 14, which results in the desired dosing of ozone mixing within the water treatment system 10.

The operation of the bypass control valve 14 will now be described. An intermediate position of the valve 14 (depicted as a yellow coloured position of three possible positions shown in FIG. 4) is a partially closed position. When the valve 14 is in the intermediate position, some of the water bypasses through the branching line 16, and through the dynamic ozone injector 30, creating a vacuum which sucks ozone from the ozonator 20. Ozone is fed through a small port on the dynamic injector 30. The ozone is mixed into the water flow and continues with the water through the ozone supply line 32, and continues to the multi-cyclone 50 or mixing device to thoroughly mix the ozone into the water.

When the bypass control valve 14 is open or partially open, a pressure differential exists across the inlet and outlets of the bypass valve 14 inlet. The pressure differential corresponds to a vacuum force which is created and which is proportional to the amount of ozone injected into the water stream, through the ozone supply line 32.

When the pressure display gauge 96 indicates a first position, corresponding to the word "CLEAN", which is also associated with a colour such as green (as depicted in FIG. 4), this indicates to the user that a final filter (not shown) which is located downstream of the water treatment system 10 is clogged and requires back washing. The pressure change results from reduced flow downstream of the water treatment system 10, and increased pressure for the water to pass through the return line to the pool. When the display gauge 96 is in this first or "green" position, this indicates that backwashing should be conducted to clean the final filter.

When pressure display gauge 96 indicates a second position corresponding to the word "DIRTY" which is also associated with a colour such as red as depicted in FIG. 4), this indicates that too much vacuum force is being created. This indicates that the input line 12 is blocked thereby bypassing all (or most) of the water through branching line 16. If this occurs, the user can attempt adjustment of the bypass control valve 14 to control ozone dosing. When the display gauge identifies the second position, the input line 12 should be cleared. Whilst the water treatment system 10 can operate with the display gauge 96 in the second, or "red" position, this is not ideal, and preferably the hydraulic problem in the line should be rectified.

Corresponding colours such as red, yellow and green as identified on the pressure display gauge 96 may also be applied to the labelled regions 100 of the bypass control valve 14 for user convenience.

Based on the reading of the display gauge 96, the user decides whether any activity is required, such as adjusting the bypass control valve if it is deemed necessary. Alternatively, the user may decide to attend to the removal of a blockage if identified upstream or downstream of the bypass control valve 14.

The bypass control valve 14 and/or the pressure differential measuring device 91 may be in communication with the ozone generator 20 to send a signal to the ozone generator 20 to switch off when the bypass control valve 14 is closed or power on when the bypass control valve 14 is open.

The multi-cyclone 50 efficiently combines the mixing of ozone gas and the removal of precipitates in one device.

The water treatment system 10 can be applied to other gasses such as (but not restricted to) oxygen and ambient air. Such applications could be applied to the aquaculture industry (but not limited to) to complete more efficient saturation of oxygen into water while also removing suspended particles.

Advantageously, the multi-cyclone 50 removes particles from the water, reducing the amount of contaminants in the water, and minimising the amount of ozone required to effectively treat the water.

The water treatment system 10 provides efficient saturation of ozone gas, or other gases, into an aqueous solution.

The water treatment system 10 allows for the removal of suspended particles with a specific gravity higher than the aqueous solution being treated.

Advantageously, the multi-cyclone sediment filter 50 allows waste that has settled after ozone exposure to be captured, as ozone tends to coagulate and precipitate various impurities present in the water.

Advantageously, the system 10 allows a user to selectively adjust the amount of ozone being mixed with the water depending on water conditions.

Although the invention has been described with reference to specific examples, it will be appreciated by those skilled in the art that the invention may be embodied in many other forms.

The claims defining the invention are as follows:

1. A water treatment system comprising:
   a water mixing unit adapted to promote water turbulence;
   an input line having an upstream end adapted to be in fluid communication with a body of water to be treated, and a downstream end in fluid communication with the water mixing unit;
   an ozone injector adapted to be connected in fluid communication with an ozone gas generation system;
   a branching line in fluid communication with the input line and the ozone injector;
   an ozone supply line in fluid communication with the ozone injector;
   a bypass control valve in fluid communication with the ozone supply line and the input line and adapted to be selectively switched between an open position and a closed position, wherein water is prevented from flowing from the ozone supply line through the bypass control valve and into the input line when the bypass control valve is in the closed position; and
   a pressure differential measuring device adapted to measure a pressure differential between a first location in the input line upstream relative to the bypass control valve, and a second location in the input line downstream relative to the bypass control valve.

2. The water treatment system of claim 1, wherein the first location is positioned in the input line between the bypass control valve and a connection with the branching line.

3. The water treatment system of claim 2, wherein the pressure differential measuring device includes;
   a housing;
   a first tube in fluid communication with an upstream side of the housing and the water input line upstream of the bypass control valve; and
   a second tube in fluid communication with a downstream side of the housing and the water input line downstream of the bypass control valve.

4. The water treatment system of claim 3, wherein the pressure differential measuring device includes a pressure indicator adapted to provide a user with an indication of the measured pressure differential.

5. The water treatment system of claim 1, wherein the bypass control valve includes one or more partially open positions.

6. The water treatment system of claim 5, wherein the bypass control valve partially open positions correspond to measurements on a gauge identified on a pressure indicator, enabling selection of a desired flow rate through the ozone injector to achieve a desired pressure differential and ozone delivery rate.

7. The water treatment system of claim 1, wherein the ozone injector includes a Venturi nozzle and a gas inlet port located at or near a restriction formed in the Venturi nozzle.

8. The water treatment system of claim 1, wherein the ozone gas generation system includes a ultra-violet ozone generation system.

9. The water treatment system of claim 1, wherein the water mixing unit is a multi-cyclone unit.

10. An ozone administering and measuring unit comprising:
    an input line having an upstream end adapted to be in fluid communication with a body of water to be treated, and a downstream end adapted to be in fluid communication with the body of water;
    an ozone injector which is connectable to an ozone gas generation system;

a branching line in fluid communication with the input line and the ozone injector;

an ozone supply line in fluid communication with the ozone injector;

a bypass control valve in fluid communication with the ozone supply line and the water input line, the bypass control valve having an open position and a closed position, wherein water is prevented from flowing from the ozone supply line through the bypass control valve and into the input line when the bypass control valve is in the closed position; and a pressure differential measuring device adapted to measure a pressure differential between a first location upstream relative to the bypass control valve, and a second location downstream relative to the bypass control valve.

11. The ozone administering and measuring unit of claim 10, wherein the first location is on the input line between the bypass control valve and a connection with the branching line.

12. The ozone administering and measuring unit of claim 11, wherein the pressure differential measuring device includes;

a housing;

a first tube in fluid communication with an upstream side of the housing and the water input line upstream of the bypass control valve; and a second tube in fluid communication with a downstream side of the housing and the water input line downstream of the bypass control valve.

13. The ozone administering and measuring unit of claim 12, where the pressure differential measuring device includes a pressure indicator adapted to provide a user with an indication of the measured pressure differential.

14. The ozone administering and measuring unit of claim 13, wherein a first position of the pressure indicator indicates that a filter is blocked;

further wherein a second position of the pressure indicator indicates that the input line is blocked.

* * * * *